UNITED STATES PATENT OFFICE

ADOLF RICHTER AND WILHELM SCHÄFER, OF DESSAU IN ANHALT, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR PURIFYING AND REFINING HYDROCARBON OILS

No Drawing. Application filed January 7, 1929, Serial No. 330,957, and in Germany February 24, 1926.

Our present invention relates to a new process according to which hydrocarbon mixtures such as insulating or transformer oils, illuminating oils, lubricating oils, motor fuels, fuel oils and the like to be purified are treated with a condensation catalyst and an adsorbing agent, the olefines contained in the oil being polymerized by the action of the condensation catalyst and the polymerized products being removed by the adsorbing agent, while the hydrocarbons themselves remain unchanged. More particularly it relates to such a process in which the said hydrocarbons are previously brought into contact in the gaseous state with heated hydrated iron oxide; it is a continuation-in-part of our application Serial No. 171,063, filed on February 25, 1927.

The losses incident to this refining process are negligible in comparison with those incident to the customary refining with sulfuric acid. As condensation catalysts there may be used zinc chlorid, iron chlorid, stannous chlorid, stannic chlorid, hydrochloric acid, sulfuric acid, phosphoric acid, chlorsulfonic acid, acetic acid, etc. The quantity of this agent necessary for purification, when used in conjunction with an adsorbing agent, is materially less than in those cases when it is used in the absence of an adsorbing agent. An important advantage of the invention is that the acid number of the oil is not increased by the refining process as it is by the use of acid condensation catalyst alone.

Especially good results are obtainable by impregnating the adsorbing agent with the condensation catalyst and using the resulting product for the treatment of the oil. The process may also be carried out by the use of a finely divided mixture of the condensation catalyst with the adsorbing agent.

In many cases it is advisable to subject sulfur-containing oils and especially those which contain sulfur having a corroding action, i. e., the so-called "active" sulfur, to a preliminary treatment for the removal of this sulfur. It has been proposed to treat the oils with lead acetate (sugar of lead) for this purpose. However, only the hydrogen sulfide dissolved in the oil and a small portion of the sulfur combined with the hydrocarbon is precipitated out thereby. Also, only incomplete desulfurization results from the known process of treating the oils in liquid or gaseous state with roasting products consisting chiefly of iron oxide, since the latter, when heated to a red heat, is scarcely capable of reaction any longer.

Now we have found that iron oxides containing hydrate water, such as, for example, bog iron ore or ochre,—that is, substances which are suitable also as gas purifying materials for the absorption of hydrocarbon sulfide,—are preferably suitable to desulfurize the hydrocarbons. By passing vaporous hydrocarbons over such iron oxides containing hydrate water the simultaneous removal of the corroding sulfur and of the disagreeable odor is complete. The activity of these materials is retained even on repeated use when temperatures of from about 300° to about 400° C. are employed for the process. The oil, desulfurized and freed from unsaturated hydrocarbons, is treated with small quantities of acid-binding agents, such as, for example, caustic lime, sodium hydroxide, calcite or calc-spar, for removing any remaining traces of acid, and distilled off with or without steam.

As absorbing agent activated carbon gives excellent results the conditions as indicated above being maintained.

The following example illustrates the process of the invention:

*Example.*—Benzine obtained from brown coal generator gas having a yellowish brown color, a disagreeable odor, a sulfur content of 8.2% and an average boiling point of 122° C. (the average of the temperatures at which 5%, 15%, 25%, 35%, 45%, 55%, 65%, 75%, 85%, and 95% by volume of the benzine distills) is distilled through iron ochre maintained at a temperature of 350° C. The resulting yellowish brown distillate has an agreeable odor and a sulfur content of 3.1%; active sulfur cannot be detected. 100 parts by weight of this distillate is agitated for 1 hour at 70° C. with 1 part by weight of concentrated hydrochloric acid and 5 parts by weight of activated carbon.

The resulting benzine after separation from the activated carbon and treatment with a small amount of lime to bind any remaining traces of hydrochloric acid is distilled with steam so long as a colorless distillate is obtained. In this manner 85-90 parts by weight of a water white benzine having an average boiling point of 114° C. and the appearance of which does not change upon standing for one month is obtained. The odor of the product is agreeable and the sulfur content, all of which is inactive, is 2.6%.

What we claim is:—

1. Process for purifying a hydrocarbon mixture which comprises passing the same, in the gaseous state, over hydrated iron oxide maintained at a temperature of from about 300° to about 400° C., condensing the hydrocarbon mixtures subjecting the mixture, in the liquid state to further treatment with activated carbon in the presence of a condensation catalyst, filtering and redistilling.

2. Process for purifying a hydrocarbon mixture, which comprises passing vapors of the same over hydrated iron oxide maintained at a temperature of from about 300° to about 400° C., condensing the hydrocarbon mixture and treating the mixture in the liquid state with activated carbon in the presence of a condensation catalyst at a temperature below the boiling point of the hydrocarbon, filtered and again distilled.

3. Process for purifying a hydrocarbon mixture, which comprises passing vapors of the same over hydrated iron oxide maintained at a temperature of from about 300° to about 400° C., condensing the hydrocarbon mixture and treating the resulting mixture with activated carbon in the presence of a condensation catalyst at a temperature below the boiling point of the hydrocarbon, separating the hydrocarbon from the activated carbon by filtration and distilling the separated hydrocarbon in the presence of an acid-combining agent.

In testimony whereof, we affix our signatures.

ADOLF RICHTER.
WILHELM SCHÄFER.